July 22, 1958    JOSEF-HEINRICH HARTMANN    2,844,734
ARRANGEMENT FOR PRODUCING PLURAL PHOTOGRAPHIC EXPOSURES
Filed April 5, 1956    2 Sheets-Sheet 1

Inventor:
Josef-Heinrich Hartmann
By [signature] Atty.

Inventor:
Josef-Heinrich Hartmann

United States Patent Office 2,844,734
Patented July 22, 1958

2,844,734

ARRANGEMENT FOR PRODUCING PLURAL PHOTOGRAPHIC EXPOSURES

Josef-Heinrich Hartmann, Erlangen, Germany

Application April 5, 1956, Serial No. 576,421

Claims priority, application Germany May 14, 1955

29 Claims. (Cl. 250—65)

This invention relates to an arrangement for producing in one illumination operation a plurality of photographic exposures, and is particularly concerned with an arrangement comprising a plurality of successively disposed light sensitive layers, especially photographic films, selenium layers or other light sensitive semi-conductor or insulating layers for producing, in a single illumination operation by X-rays or similar penetrating rays, a plurality of photographic exposures, and employing for the amplification of the illumination effect of the penetrating rays on the light sensitive layers on one or both sides thereof layers, so-called amplification foils, adapted to fluoresce under the impact of the penetrating rays.

Arrangements of this kind are for example used in X-ray plural layer exposures or for producing duplicate exposures in X-ray diagnostics, and also in arrangements for transmitting especially time-variable ("moving") X-ray pictures.

Difficulties are in such arrangements experienced in obtaining by the single illumination operation uniform illumination of all light sensitive layers and therewith upon identical development thereof identical pictures. As a rule, the light sensitive layers disposed away from the illumination source receive due to absorption of the radiation in preceding layers and foils and insert members considerably less illumination than the preceding light sensitive layers.

There are arrangements known comprising a plurality of successively disposed photographic films, which propose to overcome the above-mentioned drawback by coating the films disposed increasingly spaced from the radiation source with foils (so-called fine structure calcium-tungstate—universal or high-capacity foils) of increasing amplification power, preferably increasing thickness which is in each case determined by its optimal amplification effect. See Eggert "Fortschritte der Roentgentechnik" 39 (1929), pp. 88–100, and Hartmann "Reichsberichte Chemie" (1942), pp. 622–636. There are also used, for the equalizing of the illumination effect, in one case two different photographic films, and in another case uniformly blackened photographic films inserted respectively between the photographic films and amplification foils of uniform thickness, the degree of blackening of said photographic films decreasing with increasing spacing from the radiation source.

These known arrangements produce considerable lack of sharpness of the pictures on the photographic films disposed farthest away from the radiation source. The reasons are seen to reside in the fact that the layer of matter which has to be penetrated by the radiation to reach the last films, is too thick. This however was in the known arrangements necessary in order to achieve adequate equalization for obtaining uniform illumination of the photographic films.

The known arrangements moreover require a prolonged exposure time and therewith higher radiation dosing resulting in considerable radiation dangers. They also exhibit a hardening of the penetrating radiation which is particularly annoyingly felt in the illumination of the light sensitive layers, such hardening making the known arrangements highly voltage-sensitive, for example, incident to exposures with X-ray radiation. In addition, the number of exposures that may be obtained in one illumination operation is with the known arrangements relatively low.

The invention achieves—in an arrangement comprising a plurality of successively disposed light sensitive layers for producing several photographic exposures in a single illumination operation with X-rays or similar penetrating rays or in the production of time-depending transmittable exposures, by the use of layers containing fluorescent substances and respectively allotted to the individual light sensitive layers for the amplification of the illumination thereof—as compared with known arrangements, first, lessened absorption and lessened scattering of the penetrating radiation and therewith reduced exposure time of the light sensitive layers, second, reduction of the radiation dosage required for illumination, third, reduction of the radiation danger connected with the radiation dosage used, and fourth, reduction of the penetrating radiation in the individual foils, by coating the preponderant part of the foils with amounts of fluorescent substance per unit area which are considerably smaller than the amounts required for optimum amplification effects (thin-layer amplification foils), preferably with less than 40 mg. fluorescent substance per cm.$^2$, and by providing means in the arrangement which do not affect the penetrating radiation, for obtaining uniform illumination of the light sensitive layers for subsequent identical development thereof.

Foils are preferably used as thin-layer amplification foils, which are coated with 30 mg. and less of fluorescent substance per cm.$^2$. Preferably all foils provided in the arrangement—with the exception of the foil allotted to the light sensitive layer farthest away from the radiation source upon the side thereof facing away from the radiation source—are formed as thin-layer amplification foils. The last foil need not be a thin-layer foil because there are no succeeding light sensitive layers and such foils therefore may stronger absorb the penetrating radiation.

The intensity of the penetrating radiation decreases with increasing distance from the radiation source and, accordingly, primarily the foils nearest thereto are suitably made in the form of thin-layer amplification foils.

Very thin amplification foils can if at all be produced within bearable tolerances only with difficulties and it is therefore suitable to coat all thin-layer amplification foils of the arrangement with identical amounts of fluorescent substance per unit area. The production of such foils is thereby simplified and rendered less expensive.

The intensity of the penetrating radiation and therewith, assuming foils of identical thickness, also the illumination effect relative to the light sensitive layers, decreases at any rate with the number of foils penetrated by the radiation. It is for these reasons in the arrangements according to the invention, which are to produce a substantially complete equalization of the illumination, of advantage to use amplification foils with a content of fluorescent substance which increases from foil to foil with increasing spacing from the radiation source.

Substantially the same effect may be obtained with amplification foils of identical thickness if the fluorescent substances in the foils contain known killer substances which become from foil to foil less effective with increasing spacing from the radiation source. This may be achieved, for example, by decreasing the amounts of killer substances added to the fluorescent substances from foil to foil with increasing spacing from the radiation source.

A similar effect may likewise be obtained with amplification foils coated with substantially identical fluorescent substance in which however the mean particle size of the fluorescent crystals increases from foil to foil with increasing spacing from the radiation source. An increase in the mean particle size of the fluorescent crystals in the fluorescent substances may, for example, be obtained by producing the corresponding fluorescent substances with increasing glow temperatures and/or duration thereof. Inasmuch as the controlling factor resides in such cases in the mean particle size of the fluorescent crystals in the individual foils, the crystals may either be uniform in the individual foils but of increasing particle size from foil to foil with increasing spacing from the radiation source, or there may be used a mixture of large (strong light) and small (weak light) crystals with a mixing ratio in favor of the large crystals in the direction of increased spacing from the radiation source.

The amplification foils are in accordance with another feature of the invention made with similar but differently activated fluorescent substances such that their actinic effectiveness relative to the respectively allotted light sensitive layers increases from foil to foil with increasing spacing from the radiation source. The activation may for example be such that the emission spectrum of the fluorescent light of the amplification foils is shifted from foil to foil with increasing spacing from the radiation source relative to the direction of the absorption maximum of the light sensitive layers.

An illumination equalization or matching of the light sensitive layers may also be obtained by the provision of fluorescent matter in the foils consisting of a mixture of two fluorescent substances of different fluorescing intensity, the proportion of substance of higher intensity increasing from foil to foil with increasing spacing from the radiation source. The fluorescent substances may thereby exhibit different particle size, such that the proportion of material with larger particle size increases from foil to foil with increasing spacing from the radiation source. The foils may also contain silver activated zinc-cadmium sulphides acting as activated mixture crystals equivalent to fluorescent substances, which exhibit with different mixture ratio of the components, for example, of zinc sulphide and cadmium sulphide, different emission spectra. Mixture crystals are in such cases especially used which are adapted to embrace the entire visible spectrum.

In order to equalize fine illumination difference it may be advantageous, especially in using foils of identical thickness, to use light sensitive layers with a sensitivity to the fluorescent light of the amplification foils, which increase from foil to foil with increasing spacing from the radiation source. This may be obtained by adjustment of different curing degree of the light sensitive layers in the production thereof, or by different sensitizing of the layers with respect to the fluorescent light of the amplifier foils, or by suitable selection of different bromide silver contents in photographic films.

It is suitable in using photographic films as light sensitive layers to provide such films with halation protection means which reject the scattering light emanating from the amplification foils.

Depending upon the desired illumination of the light sensitive layers, the invention either provides an amplification foil on each side of each light sensitive layer or preferably only upon the side of each light sensitive layer which faces away from the radiation source. It is in the latter case suitable to use photographic films which are coated with light sensitive material only upon the sides thereof facing the amplification foil respectively associated therewith. The sides of the amplification foils facing away from the light sensitive layers may thereby also be provided with coating carriers which absorb the fluorescent light in part while partly reflecting it and whose absorption and reflection degree increases from foil to foil with increasing spacing from the radiation source.

The fluorescent substances in the individual amplification foils are for use with relatively soft penetrating radiation suitably made from elements of an order number as law as possible, for example, from zinc-activated or silver-activated zinc sulphide. Inasmuch as the penetrating radiation is increasingly hardened upon passage through the amplification foils, it may further be suitable to use amplification foils in the arrangement according to the invention containing fluorescent materials made from elements of mean order numbers which increase with increasing spacing from the radiation source.

It has been found particularly useful, in illuminating the arrangement according to the invention by X-rays with energies exceeding 100 kv. to produce the fluorescent substances of the foils disposed near the radiation source, from zinc sulphide while producing those of the foils disposed more remote from the radiation source from calcium-tungstate or lead-barium sulphate.

However, in the case of illumination of the arrangement according to the invention by X-rays with energies less than 100 kv., due to the utilization of the light by the zinc sulphide, which is in such range particularly high, the fluorescent substances of the foils near the radiation source may be made of calcium-tungstate and those of the foils more remote from the radiation source may be made of zinc sulphite. The picture quality of the first layers can in such a case be improved on account of the better quality that may be obtained with calcium tungstate foils.

The foregoing and other objects and features of the invention will appear from the description of embodiments which will be rendered below with reference to the accompanying diagrammatic drawings, in which.

Figure 3:
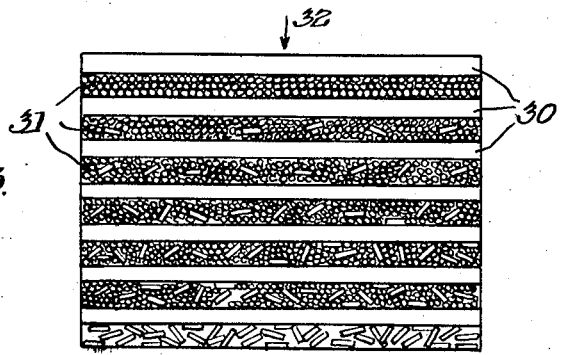
Figure 4:
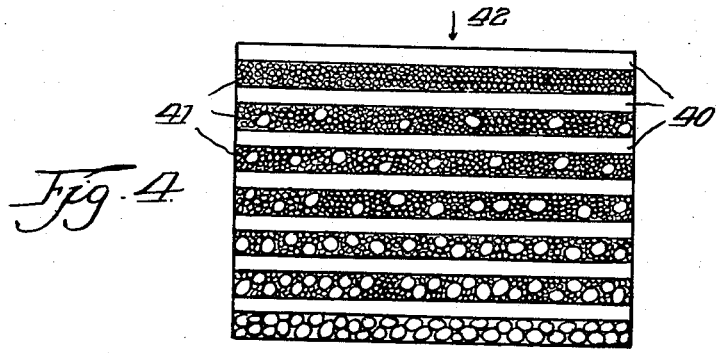
Figure 5:
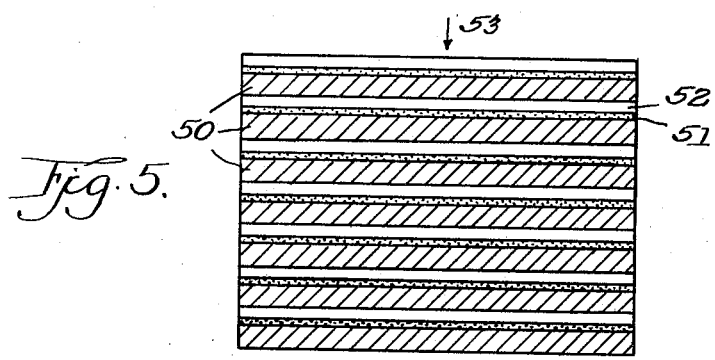
Figure 6:
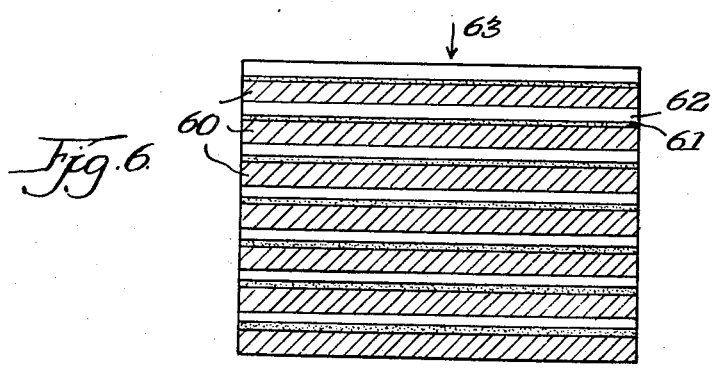

Fig. 3 indicates an arrangement having amplification foils containing mixtures of chemically different fluorescent materials;

Fig. 4 shows an arrangement utilizing amplification foils coated with fluorescent substance of different particle size; and Figs. 5 and 6 represent arrangements comprising identical amplification foils but using photographic films with different sensitivity.

Figure 1:
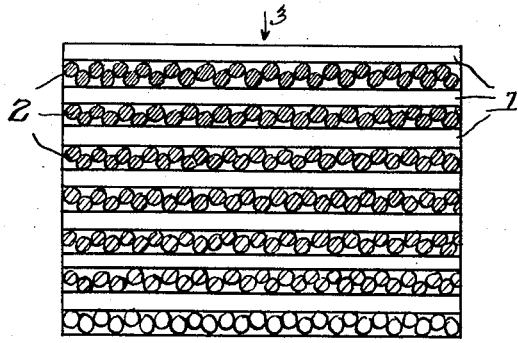
Fig. 1 shows an arrangement comprising successively disposed photographic films and amplification foils.

Referring now to Fig. 1, numeral 1 indicates photographic films and 2 indicates amplification foils. The direction in which the penetrating radiation from a source impinges on the arrangement is indicated by numeral 3. The fluorescent substances in the amplification foils have with increasing spacing from the radiation source progressively diminishing killer substances, for example, nickel additions in lowest concentrations, and the utilization of the light by the fluorescent layers of the amplification foils accordingly increases with increasing spacing from the radiation source, such increase being indicated by decreasing shading of the fluorescent substances in the amplification foils.

Figure 2:
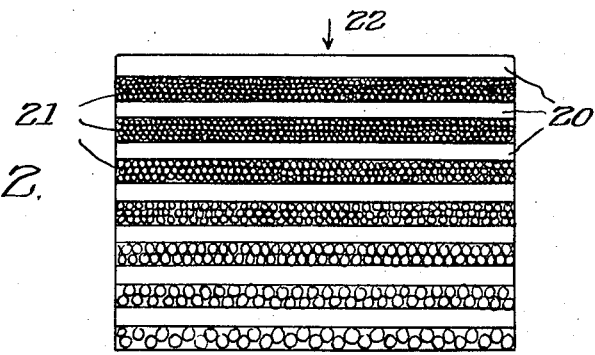
Fig. 2 illustrates an arrangement comprising amplification foils with increasing mean particle size of the fluorescent material.

In Fig. 2, there are provided photographic films 20 and amplification foils 21. The mean particle size of the fluorescent substances in the amplification foils increases with increasing spacing from the source radiating in the direction 22. Since coarse fluorescent crystals exhibit higher light utilization than fine crystals, the films remotest from the radiation source will be relatively stronger illuminated than those near the radiation source.

Fig. 3 shows a further embodiment having photographic film 30 and amplification foils 31, the latter containing a mixture of two chemically different fluorescent materials. The mixture is such that the fluorescent material with higher utilization of light increases with increasing spacing from the radiation source radiating in the direction 32.

In the arrangement according to Fig. 4, there are disposed between films 40 amplification foils 41 coated with a uniform fluorescent substance having, however, two substantially different particle sizes, such that the mixture ratio increases in favor of the coarse particle sizes with increasing spacing from the source radiating in the direction 42.

The amplification foils 50, in Fig. 5, are identical, but the light sensitive layer 51 of the photographic films 52 are different, such that the sensitivity thereof relative to the fluorescent light of the amplification foils 50 increases with increasing spacing from a source radiating in the direction 53. The sensitivity increase in the layers 51 is represented by particle size increase of silver bromide crystals, but it may also be obtained by mercury-silver or copper sensitizing.

In the arrangement according to Fig. 6, the amplification foils 60 are again identical while the light sensitive layers 61 of the photographic films 62 are different. An increasing sensitivity of the light sensitive layers 61 relative to the fluorescent light of the amplification foils 60 is obtained by silver-bromide content in the light sensitive layers 61 which increases with increasing spacing from a source radiating in the direction 63.

Changes may be made within the scope and spirit of the appended claims.

I claim:

1. An arrangement for producing in a single illumination operation, with penetrating rays emanating from a suitable source, a plurality of photographic exposures, comprising a plurality of successively disposed light sensitive layers, a plurality of amplification foils each containing fluorescent substance, each light sensitive layer being respectively in engagement with a separate amplification foil for amplifying the exposure illumination of the corresponding light sensitive layer, at least those of said amplification foils lying nearest to said ray source containing not more than 40 mg. fluorescent substance per cm.$^2$ and also containing means to graduate the degree of the amplification effect of said amplification foils with respect to the light sensitive layers respectively in engagement therewith and to provide for increasing amplification with increasing spacing from said ray source, said means being transparent to penetrating radiation.

2. An arrangement according to claim 1, comprising amplification foils coated per cm.$^2$ with 30 mg. and less of fluorescent substance.

3. An arrangement according to claim 1, comprising amplification foils containing amounts of fluorescent substance which increase with increasing spacing from said radiation source.

4. An arrangement according to claim 1, comprising amplification foils containing fluorescent materials which contain with increasing spacing from said radiation source decreasingly effective killer substances.

5. An arrangement according to claim 4, wherein the amount of killer substance in said foils decreases with increasing spacing from said radiation source.

6. An arrangement according to claim 1, comprising amplification foils coated with substantially identical fluorescent substance, the mean particle size of the fluorescent crystals in said substances increasing with increasing spacing from said radiation source.

7. An arrangement according to claim 6, wherein the particle size of the fluorescent crystals in the respective foils is substantially identical.

8. An arrangement according to claim 1, comprising amplification foils made of substantially identical but differently activated fluorescent materials, the actinic effectiveness of said particles relative to the respectively associated light sensitive layers increasing from foil to foil with increasing spacing from said radiation source.

9. An arrangement according to claim 8, wherein said fluorescent materials are activated such that the emission spectrum thereof is with increasing spacing from said radiation source shifted relative to the direction of the absorption maxima of the light sensitive layers.

10. An arrangement according to claim 1, comprising amplification foils containing fluorescent materials comprising a mixture of two fluorescent materials of different fluorescing intensity, the proportion of material of higher fluorescing intensity increasing from foil to foil with increasing spacing from said radiation source.

11. An arrangement according to claim 10, wherein the two fluorescent materials in the individual foils exhibit different particle size and wherein the proportion of material with larger particle size increases from foil to foil with increasing spacing from said radiation source.

12. An arrangement according to claim 10, wherein said foils contain substantially identically activated activated mixture crystals exhibiting at different mixture ratios of the respective components different emission spectra.

13. An arrangement according to claim 4, comprising carrier layers upon the sides of said amplification foils facing away from said light sensitive layers, said carrier layers partially absorbing the fluorescent light and the absorption degree thereof decreasing from foil to foil with increasing spacing from said radiation source.

14. An arrangement according to claim 4, comprising amplification foils containing fluorescent materials made from elements of a mean order number which increases from foil to foil with increasing spacing from said radiation source.

15. An arrangement according to claim 4, for exposure to X-rays with energies below 100 kv., comprising amplification foils disposed nearest to the radiation source and containing fluorescent material made of calcium tungstate, and amplification foils disposed relatively remote from the radiation source and containing zinc sulphide.

16. An arrangement according to claim 4, for exposure to X-rays with energies exceeding 100 kv., comprising zinc sulphide foils disposed relatively near the radiation source and calcium tungstate or barium lead sulphate foils disposed relatively remote from the radiation source.

17. An arrangement according to claim 4, comprising amplification foils coated per cm.$^2$ with 30 mg. and less of fluorescent substance.

18. An arrangement according to claim 6, comprising amplification foils coated per cm.$^2$ with 30 mg. and less of fluorescent substance.

19. An arrangement according to claim 8, comprising amplification foils coated per cm.$^2$ with 30 mg. and less of fluorescent substance.

20. An arrangement according to claim 10, comprising amplification foils coated per cm.$^2$ with 30 mg. and less of fluorescent substance.

21. An arrangement according to claim 6, comprising amplification foils containing amounts of fluorescent substance which increase with increasing spacing from said radiation source.

22. An arrangement according to claim 8, comprising amplification foils containing amounts of fluorescent substance which increase with increasing spacing from said radiation source.

23. An arrangement according to claim 13, comprising amplification foils containing amounts of fluorescent substance which increase with increasing spacing from said radiation source.

24. An arrangement according to claim 6, wherein the two fluorescent materials in the individual foils exhibit different particle size and wherein the proportion of material with larger particle size increases from foil to foil with increasing spacing from said radiation source.

25. An arrangement according to claim 6, comprising carrier layers upon the sides of said amplification foils facing away from said light sensitive layers, said carrier layers partially absorbing the fluorescent light and the absorption degree thereof decreasing from foil to foil with increasing spacing from said radiation source.

26. An arrangement according to claim 8, comprising carrier layers upon the sides of said amplification foils facing away from said light sensitive layers, said carrier layers partially absorbing the fluorescent light and the absorption degree thereof decreasing from foil to foil with increasing spacing from said radiation source.

27. An arrangement according to claim 10, comprising carrier layers upon the sides of said amplification foils facing away from said light sensitive layers, said carrier layers partially absorbing the fluorescent light and the absorption degree thereof decreasing from foil to foil with increasing spacing from said radiation source.

28. An arrangement according to claim 10, comprising amplification foils containing fluorescent materials made from elements of a mean order number which increases from foil to foil with increasing spacing from said radiation source.

29. An arrangement according to claim 10, for exposure to X-rays with energies below 100 kv., comprising amplification foils disposed nearest to the radiation source and containing fluorescent material made of calcium tungstate, and amplification foils disposed relatively remote from the radiation source and containing zinc sulphide.

References Cited in the file of this patent

UNITED STATES PATENTS 2,807,725     Schwerin _____ Sept. 24, 1957